(12) United States Patent
Heubel (10) Patent No.: US 9,411,423 B2
(45) Date of Patent: Aug. 9, 2016

(54) METHOD AND APPARATUS FOR HAPTIC FLEX GESTURING

(75) Inventor: Robert W. Heubel, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 680 days.

(21) Appl. No.: 13/368,828

(22) Filed: Feb. 8, 2012

(65) Prior Publication Data

US 2013/0201115 A1 Aug. 8, 2013

(51) Int. Cl.
| | |
|---|---|
| *G06F 3/041* | (2006.01) |
| *G06F 3/01* | (2006.01) |
| *G06F 3/0487* | (2013.01) |
| *G06F 3/0488* | (2013.01) |
| *G06F 1/16* | (2006.01) |

(52) U.S. Cl.
CPC .............. *G06F 3/017* (2013.01); *G06F 1/1652* (2013.01); *G06F 3/016* (2013.01); *G06F 3/0487* (2013.01); *G06F 3/0488* (2013.01)

(58) Field of Classification Search
CPC .......... G06F 2203/04102; G06F 3/016; G06F 3/017; G06F 3/0487; G06F 3/0488; G06F 1/1652
See application file for complete search history.

(56) References Cited

U.S. PATENT DOCUMENTS

| | | | | |
|---|---|---|---|---|
| 6,297,838 | B1 * | 10/2001 | Chang et al. .................. | 715/863 |
| 7,289,121 | B1 * | 10/2007 | Balakrishnan et al. ....... | 345/441 |
| 7,443,380 | B2 * | 10/2008 | Nozawa ......................... | 345/156 |
| 2004/0008191 | A1 * | 1/2004 | Poupyrev ................ | G06F 3/011 345/184 |
| 2005/0140646 | A1 * | 6/2005 | Nozawa ................ | G06F 1/1626 345/156 |
| 2006/0238494 | A1 * | 10/2006 | Narayanaswami et al. ... | 345/156 |
| 2006/0274036 | A1 * | 12/2006 | Hioki .................... | G06F 3/0412 345/156 |
| 2007/0247422 | A1 * | 10/2007 | Vertegaal et al. ............. | 345/156 |
| 2008/0303782 | A1 | 12/2008 | Grant et al. | |
| 2009/0066663 | A1 * | 3/2009 | Chang et al. ................... | 345/173 |
| 2009/0219247 | A1 * | 9/2009 | Watanabe .............. | G06F 1/1615 345/157 |
| 2010/0011291 | A1 * | 1/2010 | Nurmi ........................... | 715/702 |
| 2010/0060548 | A1 * | 3/2010 | Choi ...................... | G06F 3/0414 345/1.3 |
| 2010/0066685 | A1 * | 3/2010 | Cain et al. ...................... | 345/173 |
| 2010/0117975 | A1 * | 5/2010 | Cho ............................... | 345/173 |
| 2010/0141605 | A1 * | 6/2010 | Kang ..................... | G06F 1/1626 345/174 |
| 2010/0164888 | A1 * | 7/2010 | Okumura .............. | G06F 1/1626 345/173 |
| 2011/0057873 | A1 * | 3/2011 | Geissler ................ | G06F 1/1626 345/156 |
| 2011/0134145 | A1 * | 6/2011 | Moriwaki ............ | G09G 3/3208 345/660 |
| 2011/0167391 | A1 * | 7/2011 | Momeyer .............. | G06F 1/1684 715/863 |
| 2011/0227822 | A1 * | 9/2011 | Shai ...................... | G06F 1/1615 345/156 |
| 2011/0261021 | A1 * | 10/2011 | Modarres et al. ............. | 345/177 |
| 2012/0115422 | A1 * | 5/2012 | Tziortzis ................... | G06F 3/01 455/73 |
| 2012/0169609 | A1 * | 7/2012 | Britton ......................... | 345/173 |
| 2012/0188153 | A1 * | 7/2012 | Tziortzis et al. .............. | 345/156 |
| 2012/0260220 | A1 * | 10/2012 | Griffin ......................... | 715/863 |
| 2012/0268412 | A1 | 10/2012 | Cruz-Hernandez et al. | |
| 2013/0009882 | A1 * | 1/2013 | Salmela ........................ | 345/173 |
| 2013/0093660 | A1 * | 4/2013 | Hirsch .................. | G06F 1/1694 345/156 |
| 2013/0201093 | A1 * | 8/2013 | Kim ........................ | G06F 3/033 345/156 |
| 2014/0085230 | A1 * | 3/2014 | Sato et al. ..................... | 345/173 |

\* cited by examiner

*Primary Examiner* — Amare Mengistu
*Assistant Examiner* — Crystal A Mathews
(74) *Attorney, Agent, or Firm* — Medler Ferro Woodhouse & Mills (57) ABSTRACT

An electronic interactive device having a user interface with a flexible surface, a sensor configured to sense a flex gesture applied to the flexible surface, a haptic device configured to generate a haptic effect in response to the flex gesture, and a controller in signal communication with the sensor and the haptic device. The controller is configured to trigger the haptic device to provide haptic confirmation of the flex gesture and to trigger an application action associated with the flex gesture.

18 Claims, 7 Drawing Sheets

METHOD AND APPARATUS FOR HAPTIC FLEX GESTURING

FIELD OF THE INVENTION

The invention relates to a method and apparatus for haptic flex gesturing.

BACKGROUND OF THE INVENTION

Some known electronic displays may be flexible and can mimic properties of paper, such as an ability to be bent or rolled, but have limited ways to interface with a user. User inputs may be received through buttons or keys coupled to a flexible display or through a flex gesture applied to the flexible display. In response to a flex gesture, a change in an image shown on the display may be provided as the user output.

SUMMARY

According to an aspect of the present invention, there is provided a system configured to provide a haptic effect through an electronic interactive device. The electronic interactive device may comprise a user interface having a flexible surface and a sensor configured to sense a flex gesture applied to the flexible surface. The electronic interactive device may further comprise a haptic device and a controller. The haptic device may be configured to generate a haptic effect in response to the flex gesture. The controller may be in signal communication with the sensor and the haptic device, and may be configured to trigger the haptic device to provide haptic confirmation of the flex gesture and to trigger an application action associated with the flex gesture.

In some embodiments, the flex gesture sensed by the sensor may comprise bending of the flexible surface or twisting of the flexible surface.

In some embodiments, the controller may be configured to trigger the haptic device to provide a first haptic effect in response to the bending and to trigger the haptic device to provide a second haptic effect in response to the twisting. In an embodiment, the sensor may be configured to sense the flex gesture in a first direction and to sense the flex gesture in an opposite direction. The controller may be configured to trigger a first application action in response to the sensor sensing the flex gesture in the first direction and to trigger a second application action in response to the sensor sensing the flex gesture in the opposite direction. For example, the first application action and the second application action may be actions of an on-off toggle action, a select-deselect toggle action, an up-down toggle action, a left-right toggle action, a forward-reverse toggle action, a zoom-in-zoom-out toggle action, or any combination thereof.

In some embodiments, the controller may be configured to trigger the application action by outputting a signal associated with the flex gesture to a computing device configured to execute an application associated with the application action. A wireless communication device, for example, may be part of the electronic interactive device and may be configured to transmit the signal to the computing device. In an embodiment, the user interface may comprise a flexible display screen. The controller may be configured to trigger the application action by presenting the application action on the display screen.

In some embodiments, the electronic interactive device may comprise a second sensor configured to sense a touch gesture applied to the flexible surface. The controller may be configured to trigger the application action only if the second sensor has sensed the touch gesture and the sensor has sensed the flex gesture.

In some embodiments, the flexible surface of the electronic interactive device may be located at an edge of the electronic interactive device. In an embodiment, the sensor may comprise a strain gauge, a piezoelectric transducer, an accelerometer, a gyroscope, or any combination thereof.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
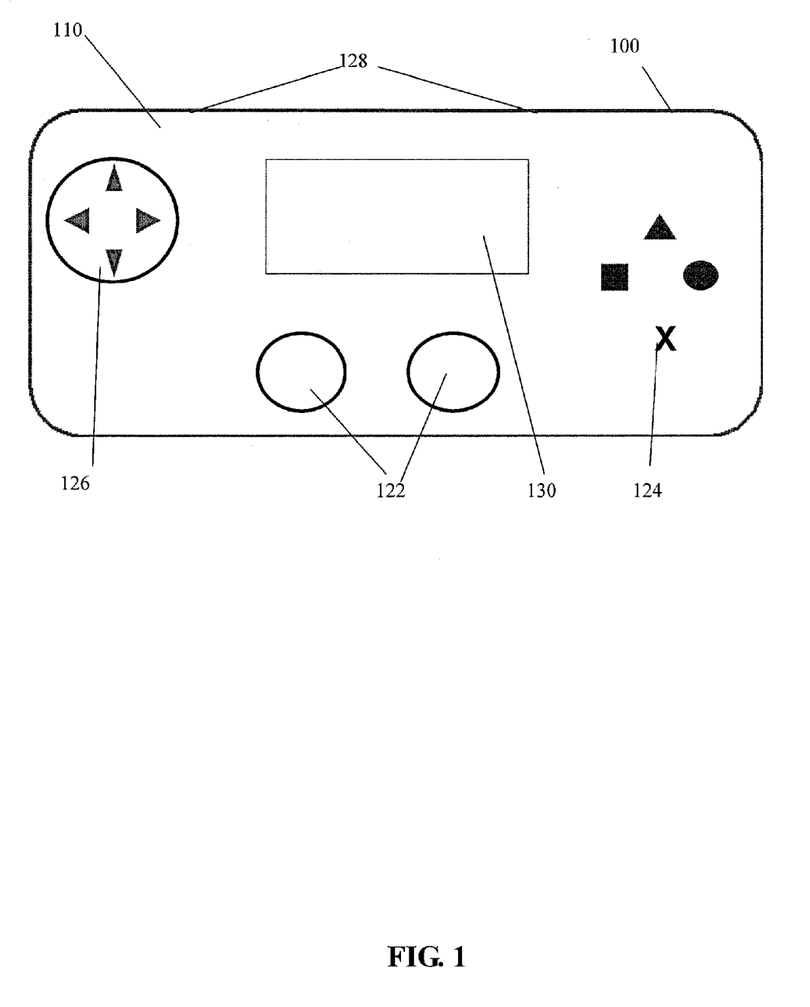
FIG. 1 schematically illustrates an apparatus in accordance with an embodiment of the invention.

FIG. 1 illustrates an embodiment of an electronic interactive device 100 that may provide a haptic effect and that may trigger an application action in response to a flex gesture applied to a flexible surface 110 of the device. A flex gesture generally refers to a gross deformation of a surface as opposed to slight flexures that may occur when a touch screen surface, for example, is pressed. The flex gesture may include bending, twisting, rolling, or any combination thereof, applied to the surface. An application action may include any response that an application or other program may have to a user input. The flex gesture may thus supplement or replace other forms of user input, such as pressing a button, pulling a trigger, or clicking a mouse. In some embodiments, electronic interactive device 100 may further include user input devices 122, 124, 126, and 128 and screen 130. Device 100 thus provides a user interface that can be used as part of a game controller or any other remote control (e.g., TV remote, steering wheel game remote), an eReader (e.g., electronic newspaper, magazine, map, or book), an interactive toy, a tablet gaming or mobile multimedia device, or any other electronic interactive device.

Flexible surface 110 may be formed from one or more flexible materials such as a plastic capable of undergoing a gross, elastic deformation as a result of a flex gesture applied by a user. In some embodiments, flexible surface 110 may cover only part of electronic interactive device 100, which may have one or more rigid portions. For example, a center portion of device 100 may embed a rigid PCB board while an edge or a corner of device 100 may comprise flexible surface 110. In some embodiments, flexible surface 110 may constitute the entire surface of device 100. In some embodiments, flexible surface 110 may have an adjustable stiffness. For example, the surface may comprise material having a stiffness that is affected by electrical current or heat. A controller of device 100 may cause current or heat to be applied to the material to control stiffness of flexible surface 110.

User input devices 122, 124, 126, and 128 may include a button, a trigger, a joystick, a knob, a switch, a slide bar, a touch pad, or any other user input device. One or more of the user input devices may be coupled to flexible surface 110 or may be coupled to a rigid portion, if any, of device 100. One or more of the user input devices may be a mechanical user input device or may be a touch-sensitive device. For example, user input device 126 may comprise four mechanical buttons while user input device 122 may comprise two touchpads configured to mimic a mechanical joystick. In that or another example, user input device 124 may comprise four buttons formed from touch-sensitive areas of device 100, such as touch-sensitive areas of flexible surface 110. User input device 128 may comprise two mechanical triggers coupled to a front side of device 100, or may comprise two touch-sensitive buttons formed on the front side.

In some embodiments, screen 130 may also be a user input device, such as a touch screen. In some embodiments, screen 130 may provide only user output. Screen 130 may be part of a rigid portion, if any, of electronic interactive device 100, or may be operatively coupled to flexible surface 110 or form part of flexible surface 110. For example, screen 130 may be embedded within surface 110 or may be mounted on surface 110. In some embodiments, flexible screen 130 may be formed from a Gyricon sheet, which is a type of electronic paper developed at Xerox PARC® (Palo Alto Research Center). The Gyricon sheet has similar physical properties as a traditional sheet of paper except that it can be rewritten many times. The Gyricon technology is essentially a technique of manipulating millions of small toner particles in a thin layer of transparent plastic wherein the toner particles are arranged in response to an application of voltage patterns. The image displayed by the Gyricon sheet will be maintained until new voltage patterns are applied. It should be noted that other flexible display technologies for manufacturing flexible displays may be used, such as organic light-emitting diode (OLED), organic/polymer thin film transistor (TFT), or any combination thereof.

Figure 2:
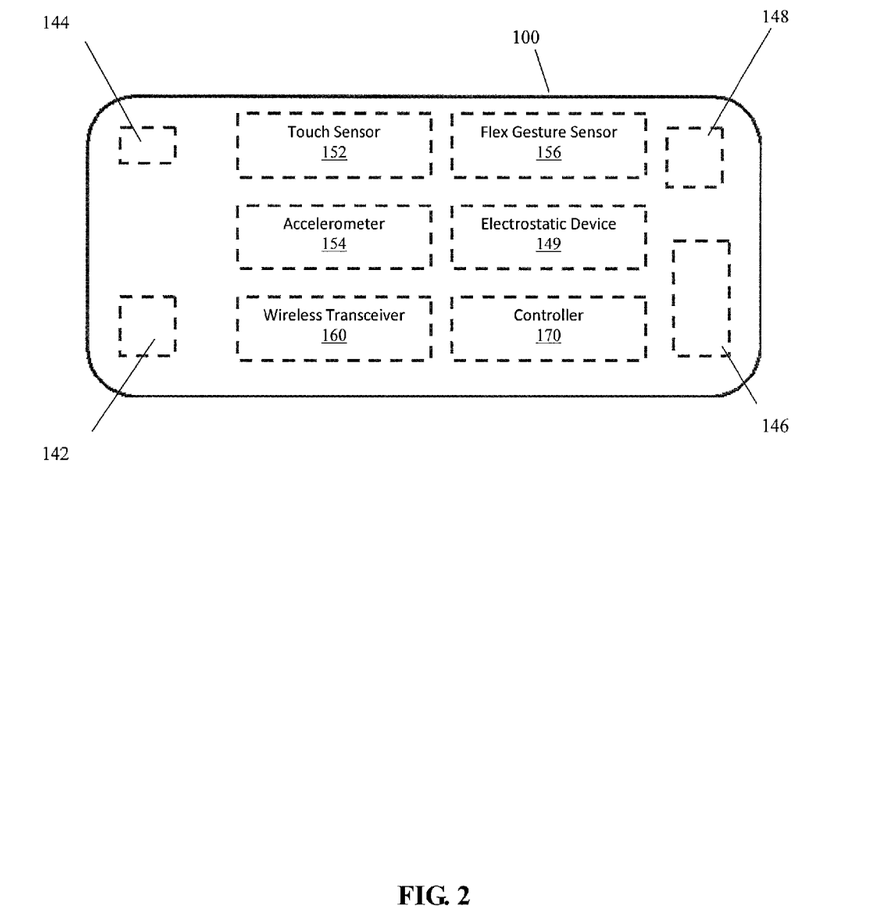
FIG. 2 schematically illustrates components of the apparatus of FIG. 1.

FIG. 2 illustrates other components that may be part of electronic interactive device 100, such as actuators 142, 144, 146, and 148, an electrostatic device 149, a wireless transceiver 160, a touch sensor 152, a flex gesture sensor 156, an accelerometer 154, and a controller 170.

Actuators 142, 144, 146, and 148 and the electrostatic device 149 may be configured to generate a haptic effect at a surface, such as surface 110, of electronic interactive device 100. The haptic effect may include a mechanical movement, such as a vibration of device 100 or an actuation of objects like pins or rods that project from a surface to touch a user. The haptic effect may include an electrostatic interaction, either to generate a force on an object, like a force that attracts a user's finger to surface 110, or to send an electric signal to an object that can perceive the signal, like a nerve of the user's finger or a sensor in a stylus. One or more of the actuators may comprise a fiber (or nanotube) of electroactive polymers (EAP), a strip of a piezoelectric element, a fiber of shape memory alloy (SMA), a voice coil, a magnetic actuator such as a solenoid, a pneumatic actuator, an ultrasonic energy actuator, an eccentric mass actuator, or any combination thereof. One or more of the actuators may be a flexible actuator, such as one formed from SMA fibers. The actuators may generate a vibration, lateral motion, up and down motion, rotational motion, or any combination thereof. Haptic actuators are discussed in more detail in co-pending U.S. application Ser. No. 11/758,638, filed Jun. 5, 2007, published as U.S. Patent Application Publication No. 2008/0303782, and entitled "METHOD AND APPARATUS FOR HAPTIC ENABLED FLEXIBLE TOUCH SENSITIVE SURFACE," the entire content of which is incorporated by reference herein. Although FIG. 2 shows four actuators, other embodiments of device 100 may have fewer (e.g., 0, 1, 2, 3) actuators or may have more (e.g., 5 or more) actuators. Each of the actuators may be located at a variety of locations, such as at an edge, corner, or center of electronic interactive device 100. The actuators may further have different sizes, or may have the same size.

Electrostatic device 149 may comprise any device that applies voltages and currents instead of mechanical motion to generate a haptic effect. In some embodiments, electrostatic device 149 may comprise an insulating layer over a conductive layer. In one example, the insulating layer may comprise a portion of flexible surface 110. Electrostatic device 149 may operate by applying an alternating-current electric signal to the conductive layer. The signal may capacitively couple the conductive layer with an object, such as a user's finger or a stylus, near or on the insulating layer. The capacitive coupling may generate a haptic effect by varying a frictional force experienced by the object as it moves across the insulating layer. Haptic electrostatic devices are discussed in more detail in co-pending U.S. application Ser. No. 13/092,269, filed Apr. 22, 2011, published as U.S. Patent Application Publication No. 2012/0268412, and entitled "ELECTRO-VIBROTACTILE DISPLAY," the entire content of which is incorporated herein by reference.

Flex gesture sensor 156 may be configured to sense a flex gesture applied to a flexible surface, such as surface 110. In some embodiments, sensing the flex gesture may include sensing a magnitude of the gesture and a direction of the gesture. For example, sensor 156 may be configured to sense not only a bending gesture, but also a direction in which the flexible surface was bent (e.g., up or down) and a magnitude of the bending. The magnitude of bending may include a rate at which the surface is bent, a degree to which the surface is bent, a duration for which the surface is bent, or any combination thereof. Sensor 156 may include any device configured to sense a gross deformation in a surface. For example, sensor 156 may include a strain gauge, an accelerometer, a gyroscope, a piezoelectric transducer, a pressure sensor, an optical fiber, or any combination thereof. In some embodiments, accelerometer 154 may be part of sensor 156. For example, sensor 156 may comprise a strain gauge and accelerometer that senses a magnitude of a flex gesture. In the example, the strain gauge may sense a degree of deformation while the accelerometer may sense a rate of deformation. In the example, sensor 156 may further comprise a gyroscope that may sense a direction of the flex gesture by sensing a direction of deformation.

In some embodiments, accelerometer 154 may be separate from any accelerometers of sensor 156. Accelerometer 154 may be configured to measure, for example, a rate of movement of a person carrying device 100. In some embodiments, device 100 may have a gyroscope separate from any gyroscopes of sensor 156. The gyroscope may be configured to measure, for example, an angle at which device 100 is tilted. In some embodiments, any piezoelectric transducer of actuators 142, 144, 146, or 148 may be separate from any piezoelectric transducer of sensor 156. In some embodiments, a piezoelectric transducer of sensor 156 may also be part of one of the actuators of device 100.

In some embodiments, one or more transducers, such as a piezoelectric transducer of device 100, may be configured to harvest power from a gesture or other movement of the device. In some embodiments, the device 100 may have no battery, and power harvested by the one or more transducers may completely power sensors, wireless transceivers, controllers, and haptic devices of device 100.

Touch sensor 152 may comprise one or more sensors configured to detect an object, such as a user's finger or a stylus, near or touching a surface of electronic interactive device 100, such as a surface of screen 130, a surface of user input device 122, or any combination thereof. In one example, touch sensor 152 may comprise one or more capacitance sensors embedded in device 100 and may be configured to sense a change in capacitance arising from a user's touch and to sense a location of the touch. In one example, touch sensor 152 may comprise a pressure sensor, a resistive sensor, a surface acoustic wave (SAW) sensor, an infrared sensor, an optical sensor, or any other sensor configured to sense a touch input at the surface of device 100. In some embodiments, touch sensor 152 may be part of one or more user input devices 122, 124, 126, 128, or screen 130.

Wireless transceiver 160 may be configured to communicate a sensed touch gesture and a sensed flex gesture to, for example, a game console, a desktop computer, a router, a home entertainment system, or any combination thereof. Wireless transceiver may be configured to communicate via a wireless protocol such as IEEE 802.11, Bluetooth®, an infrared communication protocol, a CDMA protocol, or any other wireless communication protocol.

Controller 170 may be configured to control operations of one or more components of device 100 and to trigger a haptic effect and an application action in response to a flex gesture. In one example, controller 170 may be communicatively coupled to user input devices 122, 124, 126, and 128 to receive user input received at the devices. In one example, controller 170 may be communicatively coupled to screen 130 to present visual content on the screen and to receive user input if screen 130 is a touch screen. In some embodiments, controller 170 may trigger the application action by presenting the action on screen 130. For example, if application action were a zoom action, controller 170 may zoom visual content presented on screen 130. In some embodiments, controller 170 may be communicatively coupled to touch sensor 152, flex gesture sensor 156, and wireless transceiver 160. In response to a gesture sensed by sensor 152 or 156, controller 170 may cause transceiver 160 to transmit a signal associated with the gesture to a game console, which may present an application action associated with the gesture on a TV screen. In some embodiments, controller 170 may be communicatively coupled to actuators 142, 144, 146, 148, and electrostatic device 149 to provide a haptic effect in response to receiving a sensed gesture. Controller 170 may comprise logic circuitry, one or more processors, or any other computing circuit.

In some embodiments, one or more components of device 100 may be flexible and may form part of a flexible surface, such as surface 110, or may be operatively coupled to the flexible surface.

Figure 3:
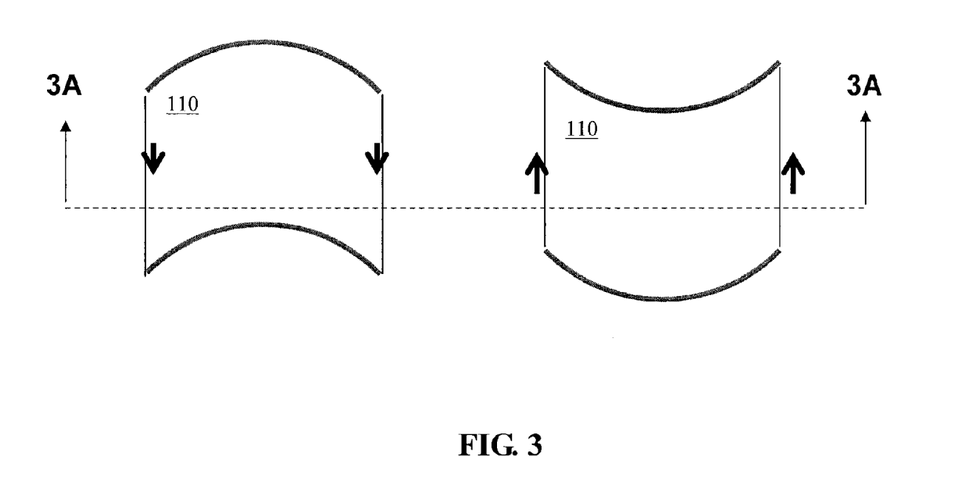
FIG. 3 schematically illustrates flex gestures being applied to the apparatus of FIG. 1.
Figure 3A:
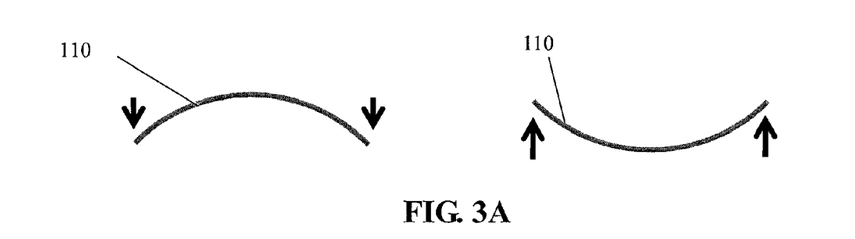
FIG. 3A illustrates a cross-section of the apparatus of FIG. 3 taken along line 3A-3A.

FIGS. 3-7 illustrate example flex gestures that may be applied to flexible surface 110 of electronic interactive device 100. FIG. 3 shows a bending gesture that may be applied to flexible surface 110. A front view of the bent surface along a line 3A-3A is shown in FIG. 3A. As the Figure shows, the flex gesture may be applied in a first direction, such as downward or inward, may be applied in a second direction, such as upward or outward, and may be applied in another direction. In some embodiments, the second direction may be opposite to the first direction. In some embodiments, the second direction may be orthogonal to or have some other relationship with the first direction. For example, the first direction may relate to bending of a left and right edge of device 100, while the second, orthogonal direction may relate to bending of an upper and lower edge of device 100. In some embodiments, a deformation may have a magnitude. The magnitude may include a degree of deformation, a rate at which the surface was deformed, a duration of deformation, or any combination thereof. In some embodiments, bending surface 110 to a threshold degree or less may constitute a first flex gesture, while bending the surface beyond the threshold degree may constitute a second flex gesture.

Figure 4:
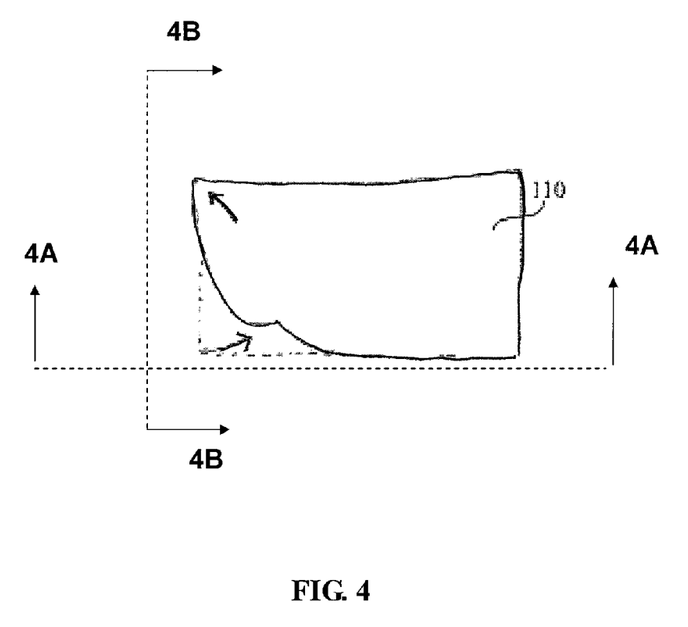
FIG. 4 schematically illustrates a flex gesture being applied to the apparatus of FIG. 1.
Figure 4A:
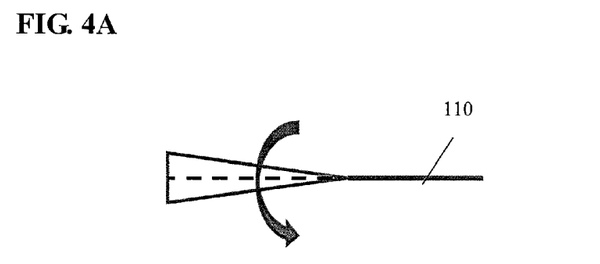
FIG. 4A illustrates a cross-section of the apparatus of FIG. 4 taken along line 4A-4A.
Figure 4B:
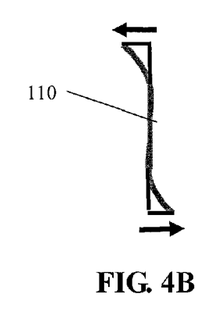
FIG. 4B illustrates a cross-section of the apparatus of FIG. 4 taken along line 4B-4B.

FIG. 4 show a twisting gesture that may be applied to one side of flexible surface 110. As seen in FIG. 4A, which shows a front view of the twisted surface along line 4A-4A, twisting may be applied to only a left side of surface 110. As seen in FIG. 4B, which shows a side view of the twisted surface along line 4B-4B, the flex gesture may be applied in a first direction, in which a left top corner is flexed outward, away from a user (assuming the surface were facing the user) or downward (assuming the surface were facing up). In the first direction, a left bottom corner may be flexed inward, toward the user or upward.

Figure 5:
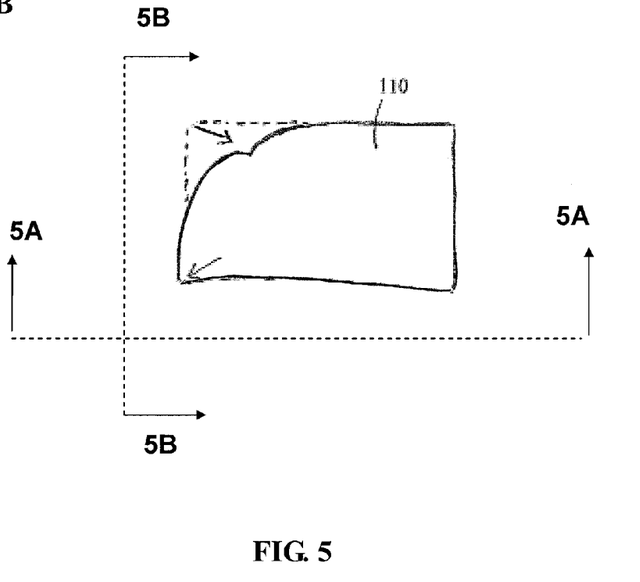
FIG. 5 schematically illustrates a flex gesture being applied to the apparatus of FIG. 1.
Figure 5A:
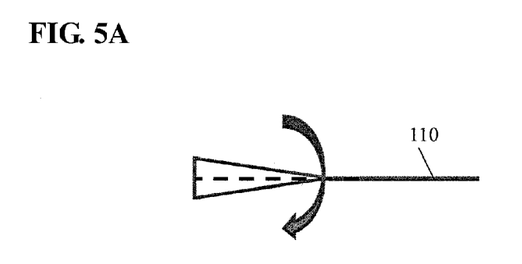
FIG. 5A illustrates a cross-section of the apparatus of FIG. 5 taken along line 5A-5A.
Figure 5B:
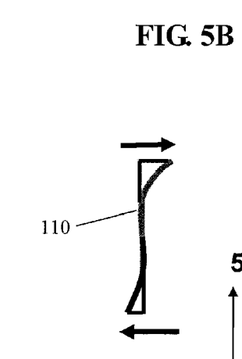
FIG. 5B illustrates a cross-section of the apparatus of FIG. 5 taken along line 5B-5B.

As seen in FIG. 5, the flex gesture may be applied in a second, opposite direction. As shown in FIG. 5B, which shows the side view of twisted surface 110 along line 5B-5B, the left top corner may be flexed inward toward the user or upward and the left bottom corner is flexed outward, away from the user or downward. FIG. 5A shows that the second direction of twisting may be applied to the left side of surface 110. The twisting gesture may be applied to the right side of surface 110 in a similar manner. In some embodiments, twisting to a threshold degree or less may constitute a first twisting gesture, while twisting beyond the threshold degree may constitute a second twisting gesture.

Figure 6:
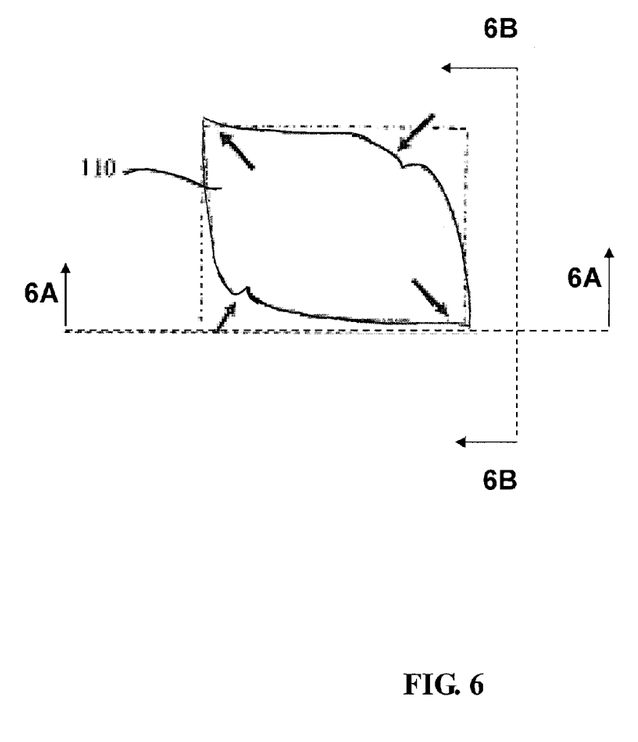
FIG. 6 schematically illustrates a flex gesture being applied to the apparatus of FIG. 1
Figure 6A:
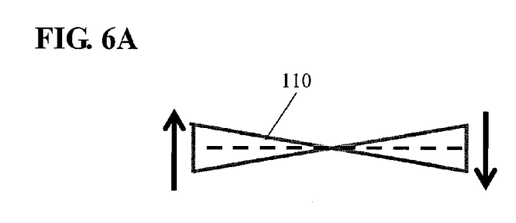
FIG. 6A illustrates a cross-section of the apparatus of FIG. 6 taken along line 6A-6A.
Figure 6B:
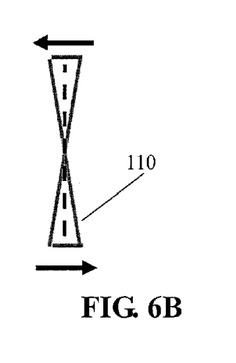
FIG. 6B illustrates a cross-section of the apparatus of FIG. 6 taken along line 6B-6B.
Figures 7, 7B:
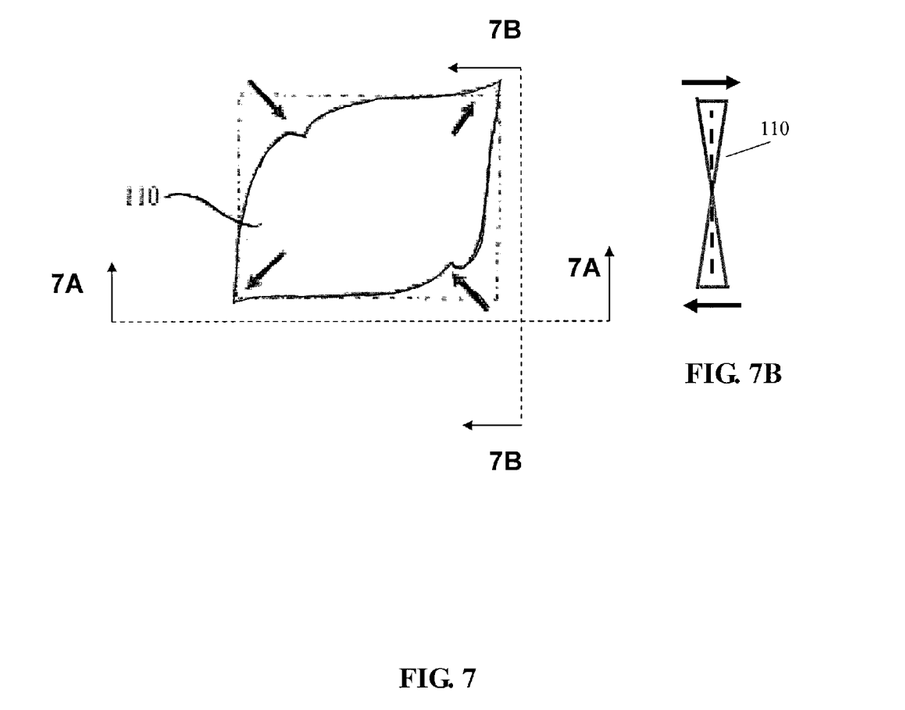
FIG. 7 schematically illustrates a flex gesture being applied to the apparatus of FIG. 1.
FIG. 7B illustrates a cross-section of the apparatus of FIG. 7 taken along line 7B-7B.

FIGS. 6 and 7 show a twisting flex gesture that may be applied to two opposing sides of surface 110. As seen in FIGS. 6A and 6B, the twisting gesture may be applied in a first direction, in which a left top corner of surface 110 is twisted outward, away from a user or downward and a right bottom corner is flexed outward, away the user or downward.

Figure 7A:
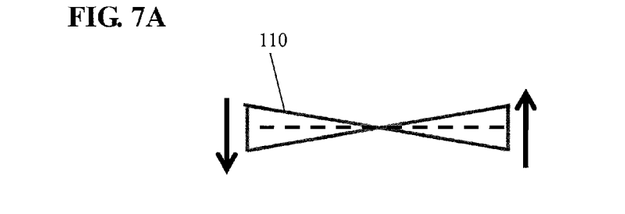
FIG. 7A illustrates a cross-section of the apparatus of FIG. 7 taken along line 7A-7A.

As seen in FIGS. 7A and 7B, the twisting gesture may be applied in a second, opposite direction, in which a right top corner is twisted outward and away from the user or downward and a left bottom corner is twisted outward and away from the user or downward. The flex gestures shown are only examples, and any other flex gesture may be applied to a flexible surface of an electronic interactive device. For example, a flex gesture may roll flexible surface 110, may bend only a corner of surface 110 without twisting the surface, or bend only one side of flexible surface 110.

A flex gesture sensed by the electronic interactive device 100 may be used as a user input that triggers an application action. The action may be triggered by, for example, controller 170. In some embodiments, the application action may be related to actions in a virtual or simulated environment, such as in a game. For example, application actions may comprise moving forward or backward in the game, firing a weapon or loading a weapon in the game, zooming in or zooming out of a binocular view of the game environment, or shuffling or passing cards in the game. Each of the application actions may be associated with a flex gesture, and may further be associated with a direction, magnitude, or a combination thereof of the flex gesture. For example, a bending gesture in an outward direction may be associated with moving forward in the game environment, while the bending gesture in an inward direction may be associated with moving backward in the game environment. A twisting gesture that flexes an upper right corner in an upward direction may be associated with firing a weapon in the game, while the twisting gesture that flexes the upper right corner in a downward direction may be associated with reloading the weapon in the game. In some embodiments, associations between flex gestures and application actions in the game or any other application may be customized by a user. The customization may be performed by, for example, controller 170, or by a computing device separate from device 100.

In some embodiments, flex gestures used in games and other applications may be applied with other forms of user input. In one example, a flex gesture may be associated with acceleration or deceleration actions of a vehicle in a game, while signals from accelerometer 154 may be associated with steering actions. In one example, a flex gesture may be associated with a movement action in a game, while pressing user input device 128 may be associated with weapon firing actions in the game. In one example, a flex gesture may be associated with weapon firing actions, while a gyroscope in device 100 may measure orientations associated with aiming directions of the weapon (or steering directions of a car) in the game. In one example, a bending gesture may be associated with drawing a bow in a game, while pressing user input device 124 may be associated with releasing the bow to shoot an arrow.

In some embodiments, an application action may be related to navigating a menu. In these embodiments, a bending gesture may be associated with advancing or retreating through a menu, scrolling up or scrolling down through menu options, or selecting or deselecting a menu option. A twisting gesture may be associated with an action to switch between menus for presentation on a screen.

In some embodiments, an application action may be related to controlling a multimedia platform, such as an eBook, music, or video application running on device 100 or a home entertainment system communicating with device 100. In these embodiments, a bending gesture may be associated with browsing forward or browsing backward through book pages, media tracks, or channels. A twisting gesture may be associated with a volume up or a volume down action. In another example, a flex gesture such as bending a corner of surface 110 may be associated with turning device 100 on or turning device 100 off, or with turning a TV on or a TV off. The application actions discussed herein are only examples, and a flex gesture may be associated with any application and any response to a user input.

Although some examples discussed herein show that a flex gesture in two opposite directions may be associated with two opposite application actions (e.g., moving forward and moving backward), the flex gesture in the two opposite directions may be associated with any two application actions. For example, a bending gesture in an upward direction may be associated with an application action to present a phone dial screen, while a bending gesture in a downward direction may be associated with an application action to play music.

In some embodiments, flex gestures may be combined. For example, an application action such as placing a TV controlled by device 100 in sleep mode may require a bending gesture in a first direction followed by a twisting gesture in a second direction. The twisting gesture may have to be applied while surface 110 is still bent, or may be applied after surface 110 is bent and then relaxed. For an application action, such as the TV hibernation action, associated with a sequence of flex gestures, other application actions such as outputting of an audio confirmation may be provided after one or more gestures in the sequence to confirm that the sequence is being correctly followed. In another example, a bending gesture may be associated with drawing a bow in a game, while a twisting gesture applied while the surface is bent may be associated with releasing the bow to shoot an arrow.

In some embodiments, an application action may be associated with a sequence having a touch gesture and a flex gesture. For example, a bending gesture may be associated with toggling between a phone vibrate mode and a phone ring mode on device 100, but controller 170 may choose not to trigger the application action unless a user has applied a touch gesture to surface 110 within a threshold amount of time before the flex gesture. For example, the user may need to apply a swiping motion in any direction on screen 130 before bending surface 110. If only the bending gesture has been detected, controller 170 may give no response or may present a visual or audio output indicating that the toggling application action cannot be triggered because no touch gesture has been received. By incorporating a touch gesture into the toggle action, device 100 may avoid inadvertently toggling from a vibrate mode to a ring mode. In some embodiments, a touch gesture may have to be applied before any flex gesture is able to trigger an intended application action. Applying a touch gesture to a surface may include touching the surface, making a swiping motion on the surface, making a pinching or expanding motion on the surface, or any other touch gesture.

In some embodiments, an application action may be associated with a sequence having an accelerometer-based gesture and a flex gesture. For example, an accelerometer-based gesture such as a swinging gesture may be made with device 100 and may be associated with simulating a tennis swing for a virtual tennis game. Accelerometer 154 and a gyroscope, for example, may detect the swing. In response to detection of the swing, an animation of a tennis swing on a screen may be triggered, such as by controller 170. In the example, a flex gesture may be associated with, for example, simulating throwing up a tennis ball for a serve. Flex gesture sensor 156, for example, may detect the flex gesture. In response to detection of the flex gesture, controller 170 may trigger an animation of a tennis serve on the screen.

Triggering an application action may comprise presenting the application action on a screen or any other user output device (e.g., a speaker). In one example, controller 170 may present a movement action in a game or a menu selection action on screen 130. Presenting the action may include causing a video chip in controller 170 to render visual content corresponding to the action. In one example, controller 170 may trigger a zoom action associated with a flex gesture by causing wireless transceiver 160 to transmit to another computing device such as a game console a signal associated with the flex gesture. The game console may then present the action on a TV screen. In the example, controller 170 may cause wireless transceiver 160 to transmit a movement command to the game console, or controller 170 may cause wireless transceiver 160 to simply transmit a signal indicating that a bending gesture in an outward direction, for example, has occurred. In the latter scenario, the game console may then generate the movement command from the bending gesture based on a gesture-to-action mapping stored on the console.

In some embodiments, a flex gesture may trigger a haptic effect. A haptic effect refers to a stimulus or force, including but not limited to a vibration, an attractive or repulsive force, a voltage or current, some other mechanical or electromagnetic force, heating or cooling, or some other stimulus. The haptic effect may comprise one or a combination of the forces or stimuli described herein. A plurality of haptic effects may be combined to form an overall haptic effect. In one example, controller 170 may sense the flex gesture and activate one or more of actuators 142, 144, 146, 148, and electrostatic device 149. The haptic effect among flex gestures may be the same, or may differ. For example, controller 170 may activate only actuator 144 in response to a bending gesture in an upward direction, may activate actuators 142 and 144 in response to the bending gesture in a downward direction, and may activate all four actuators in response to a twisting gesture. In some embodiments, a type, duration, or intensity of a haptic effect may also be varied based on what flex gesture is applied or on what application action is triggered. For example, a haptic effect triggered in response to a flex gesture that increases music volume may be more intense than a haptic effect triggered in response to a flex gesture that decreases music volume. If the flex gesture is later associated with a different application action, such as an action to change a TV channel or scroll through a menu, a different type of haptic effect (e.g., electrostatic- or thermal-based haptic effect) may then be associated with the flex gesture. In some embodiments, a type, duration, or intensity of a haptic effect may be controlled by the flex gesture. For example, the intensity (e.g., frequency and/or amplitude) of the haptic effect may be based on a magnitude of the flex gesture (e.g., a rate or degree of flexing). The more or faster that a flexible surface of an electronic interactive device is flexed, such as to trigger a greater acceleration in a game or a faster scrolling in an electronic document, the higher the frequency or amplitude of the haptic effect may be.

In some embodiments, a haptic effect may be triggered in response to a flex gesture only if the flex gesture is valid. A flex gesture may be invalid, for example, if it has no application action associated with it. In some embodiments, a default haptic effect (e.g., vibration of actuator 144 for 2 seconds at intensity level of 3) may be triggered to indicate to a user that the gesture is invalid.

In some embodiments, a haptic effect may be associated with a sequence of gestures, such as a sequence of a touch gesture and a flex gesture. The sequences may be associated with an application action such as the action to place a TV in sleep mode or the action to toggle between a phone vibrate mode and a phone ring mode, as discussed above. In one examples, a haptic effect (e.g.; vibration of actuators 142 and 144) may be provided only if the sequence of gestures is correctly applied. A different haptic effect (e.g., vibration of actuator 142) may be triggered following one or more gestures in the sequence to confirm that the sequence is being correctly followed. In one example, a default haptic effect (e.g., vibration of actuator 144 for 2 seconds at intensity level of 3) may be triggered in response to all invalid sequences of gestures.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electronic interactive device comprising:
a user interface comprising a flexible surface;
a sensor configured to sense a flex gesture user input applied to the flexible surface;
a haptic device configured to generate a haptic effect in response to the flex gesture user input; and
a controller in signal communication with the sensor and the haptic device, the controller configured to
trigger the haptic device to provide haptic confirmation of the flex gesture user input, and
trigger an application action in response to the flex gesture user input,
wherein the sensor is configured to sense the flex gesture user input in a first direction and to sense the flex gesture user input in an opposite direction,
wherein the controller is configured to trigger a first application action in response to the sensor sensing the flex gesture user input in the first direction and to trigger a second application action in response to the sensor sensing the flex gesture user input in the opposite direction.

2. The electronic interactive device of claim 1, wherein haptic device comprises an actuator.

3. The electronic interactive device of claim 1, wherein the controller is configured to trigger the application action by outputting a signal associated with the flex gesture user input to a computing device configured to execute an application associated with the application action.

4. The electronic interactive device of claim 3, further comprising a wireless communication device configured to transmit the signal to the computing device.

5. The electronic interactive device of claim 1, wherein the user interface comprises a flexible display screen, and wherein the controller is configured to trigger the application action by presenting the application action on the display screen.

6. The electronic interactive device of claim 1, further comprising a second sensor configured to sense a touch gesture applied to the flexible surface.

7. The electronic interactive device of claim 1, wherein the flexible surface is located at an edge of the electronic interactive device.

8. The electronic interactive device of claim 1, wherein the sensor comprises a strain gauge, a piezoelectric transducer, an accelerometer, or a gyroscope.

9. The electronic interactive device of claim 1, wherein the flex gesture user input sensed by the sensor comprises bending of the flexible surface.

10. The electronic interactive device of claim 9, wherein the flex gesture user input sensed by the sensor comprises twisting of the flexible surface.

11. The electronic interactive device of claim 10, wherein the controller is configured to trigger the haptic device to provide a first haptic effect in response to the bending and to trigger the haptic device to provide a second haptic effect in response to the twisting.

12. The electronic interactive device of claim 1, wherein the first application action and the second application action are actions selected from the group consisting of: an on-off toggle action, a select-deselect toggle action, an up-down toggle action, a left-right toggle action, a forward-reverse toggle action, and a zoom-in-zoom-out toggle action.

13. The electronic interactive device of claim 1, wherein the controller is configured to cause the haptic device to base a frequency or amplitude of the haptic confirmation on a magnitude of the flex gesture user input.

14. The electronic device of claim 1, further comprising an accelerometer configured to sense an accelerometer-based gesture, wherein the controller is configured to trigger the first application action based on the accelerometer-based gesture and the first flex gesture user input.

15. A haptic gesture recognition method comprising:
sensing a first flex gesture user input applied to a flexible surface of a user interface in a first direction with a flex gesture sensor;
generating a haptic effect to the user interface with a haptic device in response to said sensing the first flex gesture user input;
triggering a first application action in response to the first flex gesture user input with a controller;
sensing a second flex gesture user input applied to the flexible surface of the user interface in a second direction opposite the first direction with the flex gesture sensor;
generating the haptic effect to the user interface with the haptic device in response to said sensing the second flex gesture user input; and
triggering a second application action in response to the second flex gesture user input with the controller.

16. The method of claim 15, wherein said triggering the first application action comprises outputting a signal associated with the first flex gesture user input to a computing device executing an application associated with the first application action or presenting the first application action on a display screen of the user interface.

17. The method of claim 15, wherein said sensing the first flex gesture user input comprises sensing bending of the flexible surface, or twisting of the flexible surface.

18. The method of claim 15, further comprising sensing an accelerometer-based gesture with an accelerometer, wherein the first application action is triggered in response to the accelerometer-based gesture and the first flex gesture user input.

* * * * *